Patented Dec. 24, 1940

2,226,452

UNITED STATES PATENT OFFICE 2,226,452

METHOD FOR THE EXTRACTION AND PURIFICATION OF RENIN

Wilbur Willis Swingle, Princeton, N. J., assignor to Research Corporation, New York, N. Y., a corporation of New York No Drawing. Application May 15, 1939, Serial No. 273,805

5 Claims. (Cl. 167—74)

This invention relates to a method for the production of an extract of kidney tissue consisting essentially of a powerful blood pressure raising principle known as renin.

An object of the invention is to provide a simple process for the efficient extraction and purification of the pressor principle content of the kidney.

A further object of the invention is to produce a powerful non-toxic product consisting of or containing the pressor principle, the potency of which readily may be tested.

A highly concentrated extract of the pressor principle which is suitable for intravenous injection and which appears to be entirely free of toxic effect may be prepared by the following procedure.

Kidneys from freshly killed hogs are transported to the laboratory as soon as possible. Kidneys from freshly killed hogs, if frozen immediately, may be used. Highly potent extracts have been obtained from kidneys frozen for 7-10 days. However, if the kidneys are allowed to remain for any length of time at room temperature the pressor substance apparently rapidly deteriorates. The medullary portion of the kidney is cut out and discarded, and only the cortex is used. The separated cortex is ground to a fine paste and extracted 24-48 hours in 2% sodium chloride solution using three volumes of the salt solution for each volume of kidney cortex. A one inch covering layer of toluene is employed to protect the material which is kept at 6° centigrade and stirred frequently. After extracting for 24-48 hours at 6° C., the resulting thick soup is strained through gauze and the meat residue pressed to dryness and discarded. The resulting liquid is centrifuged through a Sharples supercentrifuge to remove finely divided meat particles and tissue debris. The residue is discarded.

The fluid after centrifugation is brought to pH 4.5 with 10% hydrochloric acid and allowed to stand in the refrigerator at 6° C. for 24 hours. It is then again centrifuged, using the Sharples super-centrifuge to remove the major portion of the precipitate formed by the acidification and standing. The separated precipitate is discarded. The separated liquid is filtered on large Buchner funnels using Celite Filter Aid (Johns Manville Co., N. Y.).

The filtrate is brought to pH 6.8 to 6.9 with 10% sodium hydroxide and is concentrated by vacuum distillation in large balloon flasks at an external temperature of 45° C. It is important that the temperature not greatly exceed this figure since the active substance is heat labile and quickly loses physiological activity at higher temperatures. Concentration proceeds until the liquid has been reduced to about $\frac{1}{10}$ of the volume of the original mixture of salt solution and kidney tissue and forms a thick sludge in the flasks. This sludge is poured off into suitable containers and may be stored without preservative for a period of at least two months if kept at 6° C. This material constitutes the crude stock concentrate and is very rich in pressor substances, and also contains some depressor substances. Five cubic centimeters of the solution obtainable by centrifuging the sludge, if intravenously injected at the rate of 1 cc. every 15 seconds, raises the arterial pressure of a 10 kilo dog an average of 100 mm. Hg. above the normal resting blood pressure.

Preparatory to further purification the stock concentrate is filtered through a cake of Hyflo Super Cel Filter Aid to remove inactive solids which are then discarded. Concentration of the original 2% salt extract has raised the sodium chloride concentration of the stock concentrate to 20%. Enough additional salt is added to bring the sodium chloride concentration to 25 or 30%. The resulting separated fluid (dark brown in color) containing the active pressor substance is brought to pH 2.0 with 10% hydrochloric acid and stored in the refrigerator at 6° C. for 12 hours. A heavy precipitate forms and the active pressor principle is contained in this precipitate. This precipitate has been salted out at pH 2.0. This precipitate is filtered off using Hyflo Super Cel Filter Aid (Johns Manville Co.). The filtrate containing the high concentration of sodium chloride is discarded. The filter cake containing the active material and negligible quantities of salt is broken up and suspended in N/5000 sodium hydroxide equivalent to 8 times the volume of the crude stock concentrate. The pH of the solution is approximately 4.5. The solution is then carefully brought to a pH of 6.2 by adding N/10 sodium hydroxide and is allowed to stand 12 hours at 6° C. The precipitate which forms is filtered off (using Hyflo Super Cel Filter Aid) and discarded.

The separated fluid is concentrated to ½ of the volume of the stock concentrate by vacuum distillation at an external temperature of 45° C. The resulting product has a pH of 6.2. Three cubic centimeters of this concentrate injected intravenously into a 10 kilo dog at the rate of 1 cc. every 15 seconds, raises the arterial pressure approximately 100 mm. Hg. above the normal resting pressure.

This concentrate (300 cc. volume) is further purified by lowering the pH to 2.0 to 2.4 with 10% HCl. Any precipitate forming at this point is filtered off and discarded. Such precipitate is inactive since the salt concentration of the solution is low and the pressor principle is in solution in the supernatant fluid.

Solid sodium chloride is added to the solution until the concentration is 25%. A heavy white precipitate forms at once and after standing for 1–2 hours at 6° C. is centrifuged off. The active pressor principle is in this precipitate. The filtrate is discarded.

The precipitate is taken up in 150 cc. distilled $H_2O$. The pH is carefully brought to 6.5 using 10% sodium hydroxide. One cc. of this concentrate is equivalent to 20 grams of fresh hog kidney cortex.

Considerable inert material can still be eliminated from this concentrate by lowering the pH to 4.0 to 4.5 using N/10 HCl. The solution contains negligible amounts of salt. After centrifuging off and discarding the inactive precipitate the solution is diluted with one volume of distilled water. Solid sodium chloride is added with careful stirring until the salt concentration is 25%. The pH of the solution is then brought to 2.5 by the careful addition of N/10 HCl and the active material precipitates. After thorough chilling at 2° C. this precipitate is centrifuged off and the supernatant fluid discarded. The precipitate may be dissolved in 25 to 50 cc. of distilled water, and the pH of the solution brought to 6.5 to 6.9 with N/10 NaOH. One to 1.5 cc. of this solution raises the mean arterial pressure 100 mm. Hg. above the normal resting pressure. The material is non-toxic.

This concentrate is then further purified as follows: 25 to 50 cc. is diluted to 400–500 cc. volume with cold M/10 acetate buffer, pH 5.00. Solid ammonium sulfate is added to 0.4 saturation. The precipitate which forms is filtered off using No. 512 Filter Aid (Johns Manville Co., N. Y.) and the filter cake stored at 5° C. in a small volume of M/10 acetate buffer. The clear filtrate is brought to 0.5 saturation by addition of solid ammonium sulfate. The precipitate which forms at 0.5 saturation and pH 4.95 to 5.05 contains most of the pressor principle. This precipitate is removed by suction filtration using No. 512 Filter Aid and the cake stored in M/10 pH 5. acetate buffer. The filtrate is brought to 0.6 saturation with solid ammonium sulfate and the small amount of precipitate which forms is filtered off using No. 512 Filter Aid. The filtrate is discarded.

The filter cake removed at 0.6 saturation is combined with that removed at 0.4 saturation and sufficient M/10 pH 5 acetate buffer added to give a milky suspension. After stirring for ten minutes the Cel is filtered off. The Cel cake is then leached 3 or 4 times with fresh portions of M/10 pH 5 acetate buffer. The washings are filtered off and combined with the first filtrate (obtained by combining .6 saturation fraction with the .4 saturation fraction and filtering). This fraction (250–300 cc. volume) is then brought to .5 saturation by addition of solid ammonium sulfate. The suspension is filtered after addition of 10 to 15 grams No. 512 Cel. The filtrate is discarded.

The filter cake (.5 saturation of .4 and .6 saturation fractions) is combined with the first filter cake obtained at .5 saturation at pH 5.00. Enough M/10 pH 5 acetate buffer solution is added to give a milky suspension. After stirring 10 minutes the Cel is filtered off, leached 3–4 times with fresh buffer solution. Each successive leaching is filtered off and added to the first filtrate. The filtrate and leachings obtained from the combined .5 saturated pH 4.95 to 5.05 fractions is reprecipitated by addition of solid ammonium sulfate to .5 saturation. After standing 12–24 hours at 5° C. the precipitate is filtered off using No. 512 Cel. This cake is refractionated between 0.4, 0.5 and 0.6 saturated ammonium sulfate in M/10 acetate buffer at pH 5.00. The .5 saturation fractions are combined and reprecipitated as outlined above at .5 saturation and pH 4.95–5.05. The precipitate obtained at this saturation and pH is collected in a small Buchner funnel with 3–5 grams of No. 512 Cel. The cake is repeatedly leached with small portions of distilled water and the active pressor fraction which is water soluble is collected in a total volume of 40–50 cc. water. This solution is dialyzed for 24 hours at 5° C. to remove sulfate and other diffusible material.

The solution is pale yellow in color and contains 3 to 4 milligrams of solids per cc. The total nitrogen content is 15.4 to 15.7% of the total solids. One to 1.5 cc. injected intravenously at the rate of 1 cc. each 15 seconds raises the mean arterial pressure of a 10 kilogram dog at least 100 mm. Hg. above the normal resting level of blood pressure. The material is non-toxic. Intravenous doses representing 0.1 mgm. of solids and 0.016 milligram of nitrogen per kilogram of body weight will raise the mean arterial pressure at least 40 mm. Hg. above the normal resting level. The pressure rise is prolonged and it requires 25–45 minutes for the pressure to decline to the resting level. These small doses are given within 2–3 seconds.

This solution will retain its activity for long periods if kept solidly frozen. If lyophiled and kept in the dry state as a powder under vacuum, it will retain its activity for at least three weeks and probably longer, although it has not been tested beyond 21 days.

The active pressor substance is positive for all of the standard protein tests and is apparently a globulin.

In brief the process described in detail above comprises first the extraction of the kidney cortex with sodium chloride solution, second the preliminary purification of the extract by permitting it to stand in the cold with a suitable adjustment of its pH value and discarding separated solid matter, third, the concentration of the purified solution or extract by vacuum distillation and the separation of any solid matter deposited as a result of the concentration, all of the foregoing operation being carried out in a relatively weak, e. g., 5% or less, salt solution, fourth, the adjustment of the pH value and sodium chloride content of the solution so as to precipitate the active substance, fifth dissolving the precipitate including the active substance and subjecting the resulting solution to further purification by concentration, standing in the cold and adjustment of the pH value, sixth a second precipitation of the active substance at a high sodium chloride concentration and low pH value, seventh a third precipitation of the active substance at a high sodium chloride concentration and a low pH and eighth a systematic fractional precipitation of the pressor substance from ammonium sulfate solution. A peculiar property of the active substance which is utilized in the purification procedure is that at a high sodium chloride concentration, e. g., 25-30%, the active substance precipitates when the pH value of the solution is lowered to about 2 to 2.5 whereas at lower sodium chloride concentration and at pH values ranging all the way from 2 up to about 7.0 the active substance remains in solution while the impurities precipitate. This peculiar property of the active substance at different salt concentrations greatly facilitates its purification and as appears is utilized three times in the above described detailed procedure in arriving at what appears to be a substantially pure product.

The potency of the product or extract is tested as follows:

Normal dogs weighing approximately 10-12 kilo are used. They are given 0.5 cc. per kilogram of body weight of pentobarbital sodium "Nembutal" injected intraperitoneally thereby producing anaesthesia.

The blood pressure is determined by the direct needle puncture method (Parkins, W. M., Amer. Journ. Physiol. vol. 107, 1934). The pressure is determined in the femoral artery, and the extract injections are made into the jugular vein. No cuts or wounds are made on the animal and complete recovery from the anaesthetic occurs within a few hours. The dog is none the worse for the experience. The only reason for using an anesthetic is because too much time would be required to train the number of dogs needed for testing large numbers of fractions. The trained unanaesthetized animal reacts to the pressor substance in an identical fashion to the dog under anaesthesia. It is necessary to determine the resting level of arterial pressure in each test and under uniform conditions before the pressor action of the drug or extract injected can be evaluated.

The evidence at present available indicates that the non-toxic pressor substance obtained from normal kidneys as described above is identical with the pressor substance found in large amounts in the kidneys of experimental hypertensive dogs following application of the Goldblatt clamp to the renal artery. It appears also that the kidneys of the human hypertensive patient form this substance in unusual amounts or else fail to excrete it.

I claim:

1. Process for the purification of the kidney pressor substance contained in an impure aqueous extract of kidney cortex which comprises adjusting the pH value of the extract to about 2 to 2.5 and the sodium chloride content to at least about 25% and recovering the precipitate deposited.

2. Process for the preparation of a blood pressure raising composition from kidney cortex which comprises preparing an aqueous extract of about 1 part by volume of kidney cortex in about 3 parts by volume of 2% sodium chloride solution, concentrating the extract to about $\frac{1}{10}$ its original volume adjusting the pH of the concentrated extract to about 2.0 and the sodium chloride content to at least about 25% and separating the resulting precipitate.

3. Process for the preparation of a blood pressure raising substantially non-toxic composition which is suitable for intravenous injection which comprises preparing an aqueous extract of isolated kidney cortex, adjusting the pH value of the extract to about 4.5 and separating and discarding precipitate, concentrating the extract to about $\frac{1}{10}$ its original volume, adjusting the pH value of the concentrated extract to about 2 and the sodium chloride content to at least about 25% and separating and recovering the precipitate formed, redissolving the precipitate and adjusting the pH value of the resulting solution to about 6.2 and separating and discarding precipitate formed, concentrating the separated solution to about ½ its volume, adjusting the pH value of the solution downwardly in stages to a final value of about 2 to 2.4 and separating and discarding precipitate formed at each stage, adjusting the sodium chloride content of the solution to at least about 25% and separating and saving the precipitate so formed, dissolving the precipitate in water, adjusting the pH of the resulting solution to about 4 to 4.5 and separating and discarding precipitate formed, adjusting the pH of the resulting solution to not more than about 2.5 and the sodium chloride content to at least about 25% and separating and saving the resulting precipitate.

4. Process for the extraction and purification of a blood pressure raising substance from kidney cortex which comprises preparing an extract of isolated kidney cortex in a dilute aqueous solution of sodium chloride, selectively separating the pressor substance in solid form from such solutions thereof by a procedure involving raising the sodium chloride concentration to at least 25% and lowering the pH value to not higher than 2.5 and selectively separating impurities from such solutions by a procedure involving adjusting the pH value to between 2.5 and 7 and the sodium chloride concentration to a value less than 25%.

5. Process for the purification of the pressor substance contained in an aqueous extract of isolated kidney cortex which comprises the steps of allowing the extract to stand at temperatures in the neighborhood of 0° C., concentrating of the extract by evaporation and separating solid and liquid components, accompanied by adjustment of the pH value and sodium chloride concentration to a pH value not higher than 2.5 with a sodium chloride concentration of at least 25% to separate the pressor substance in solid form and the pH value to between 2.5 and 7 with a sodium chloride concentration less than 25% to separate impurities in solid form, and finally precipitating the partially purified pressor substance from an aqueous solution thereof by the addition of ammonium sulfate.

WILBUR WILLIS SWINGLE.